US006927991B2

(12) United States Patent
Perroni et al.

(10) Patent No.: US 6,927,991 B2
(45) Date of Patent: Aug. 9, 2005

(54) MEMORY DEVICE ACCESSIBLE WITH DIFFERENT COMMUNICATION PROTOCOLS

(75) Inventors: Maurizio Francesco Perroni, Furnari (IT); Andrea Scavuzzo, Palermo (IT); Salvatore Polizzi, Palermo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 128 days.

(21) Appl. No.: 10/653,459

(22) Filed: Sep. 2, 2003

(65) Prior Publication Data

US 2005/0099833 A1 May 12, 2005

(30) Foreign Application Priority Data

Sep. 6, 2002 (IT) .......................... VA2002A0045

(51) Int. Cl.[7] .............................................. G11C 5/06
(52) U.S. Cl. ............... 365/63; 365/230.06; 365/189.07
(58) Field of Search ........................... 365/63, 230.06, 365/189.07

(56) References Cited

U.S. PATENT DOCUMENTS

| 4,096,567 A | * | 6/1978 | Millard et al. ................. 707/10 |
| 5,321,819 A | * | 6/1994 | Szczepanek ................. 709/228 |
| 6,122,216 A | * | 9/2000 | Dykes .................... 365/230.03 |

* cited by examiner

Primary Examiner—Richard Elms
Assistant Examiner—Tuan T. Nguyen
(74) Attorney, Agent, or Firm—Lisa K. Jorgenson; Allen, Dyer, Doppelt, Milbrath & Gilchrist, P.A.

(57) ABSTRACT

A memory device includes a multi-protocol interface having at least two interfaces. Each interface decodes a respective communication protocol when enabled by a respective interface enable signal. The memory device further includes an automatic selection circuit for selecting one of the interfaces corresponding to a received communication protocol. The automatic selection circuit compares bits transmitted during a preamble of a received communication protocol cycle with pre-established bit patterns corresponding to preambles of the communication protocols associated with the at least two interfaces, and generates an enable signal for one of the interfaces based upon the comparison.

20 Claims, 4 Drawing Sheets

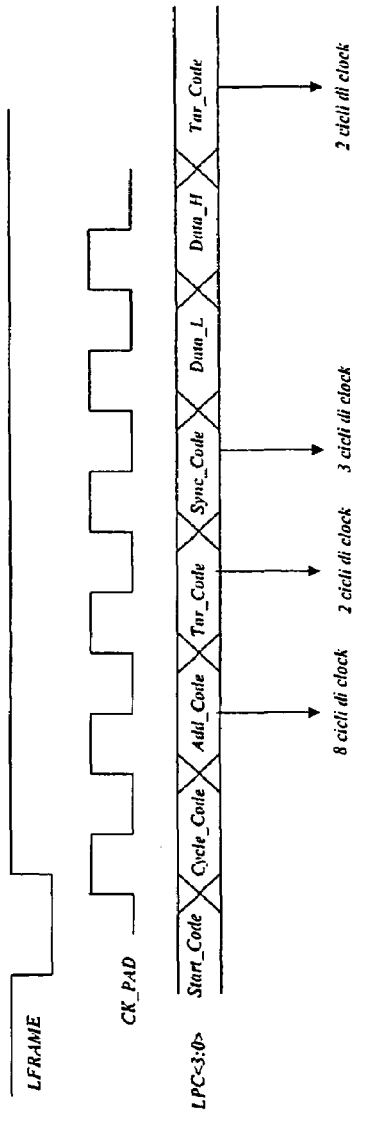
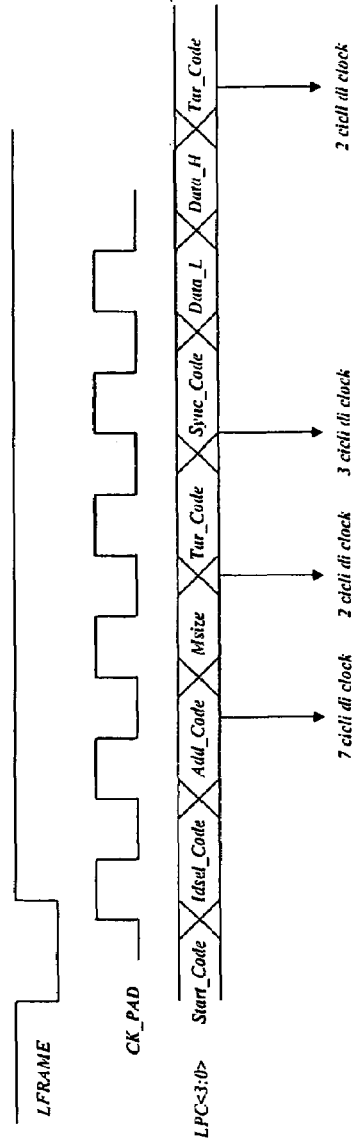

MEMORY DEVICE ACCESSIBLE WITH DIFFERENT COMMUNICATION PROTOCOLS

FIELD OF THE INVENTION

The present invention relates to memory devices, and in particular, to a memory device supporting a plurality of communication protocols by automatically recognizing the protocol encoding the data.

BACKGROUND OF THE INVENTION

The technical areas in which volatile and nonvolatile memory devices are used are innumerable. Memory devices are used in digital cameras, measurement instruments, and the like to mention only a few.

A functional block diagram of a known memory device capable of managing low pin count (LPC) and firmware hub protocols is depicted in FIG. 1. The communication protocols LPC and firmware hub may be supported by the same device because they require similar or compatible electrical characteristics. They may be used for memory devices with the same number of input/output pins (4), including a pin for a timing signal CK_PAD and a pin for a start signal LFRAME of the preamble.

In the ensuing description reference will be made to these two protocols, though the same considerations apply for protocols different from the firmware hub and the LPC protocols, provided they are applicable to memory devices of similar electrical characteristics.

The sample device shown in FIG. 1 comprises typically a standard memory core FLASH CORE having a serial communication interface LPC/FWH INTERFACE connected to four input/output pins LPC_PAD<3:0> for conveying data and addresses to a fifth pin CK_PAD for a clock signal, and to a sixth pin LFRAME for receiving a start signal of a cycle of a communication protocol. The interface generates the chip enable (CE) and write enable (WE) commands for respectively enabling the memory and for writing in the memory.

The commands relative to the various cycles of the communication protocol containing the information relating to addresses and data are input to the device through the pins connecting the device to the external bus LPC/FWH BUS. The received data are placed in parallel by the interface circuit for conveying the data to the standard memory FLASH CORE through the address bus ADDR<20:0> and the data bus DBUS<15:0>.

A configuration circuit CAM SETTING generates two enabling signals FWH ENABLE and LPC ENABLE that configure the memory device for either a firmware hub or an LPC protocol. During testing on wafer (or EWS) while the device is being fabricated, the circuit CAM SETTING is configured so that the memory device may manage either a firmware hub or LPC protocol according to customer needs.

Typically, the circuit CAM SETTING comprises a nonvolatile (read only) memory cell FLASH EPROM that stores a bit whose value specifies the kind of protocol to be used. It is convenient to form memory devices according to this technique because it allows substantially the fabrication of a base memory device that is eventually configured for one of the protocols depending on the customer's need during the last phase of the fabrication process.

The two protocols, firmware hub and LPC, contemplate a different succession of cycles. During each cycle of the LPC protocol, a single bit is read, as depicted in FIG. 2.

For the first twelve clock cycles, the external host of the memory device controls an I/O system bus (not depicted in FIG. 1) connected to the bus PAD_EXT<3:0>. During these cycles the external host provides appropriate codes to the memory device for accessing the standard memory FLASH CORE.

The above mentioned twelve cycles are as follows: a preamble START_CODE that begins when the signal LFRAME assumes a low logic level; a cycle CYCLE_CODE that specifies whether a READ or a WRITE operation is to be performed; eight cycles ADD_CODE that provide the address of the memory location in which the host performs a read or write operation; and two cycles TAR_CODE that signal that the control of the system bus has been released.

After these two last cycles the standard memory FLASH CORE takes control of the system bus. Therefore, the memory FLASH CORE generates wait cycles SYNC_CODE during which it carries out internal operations. When it has finished reading, it makes the read data available through two further cycles DATA_L and DATA_H, and finally, through two more cycles TAR_CODE. The memory then releases control of the system bus to the external host.

FIG. 3 shows a succession of cycles for performing a read operation with a firmware hub protocol that contemplates the following: a preamble START_CODE signaling the beginning of the protocol cycle and specifying also whether a write or read operation is to be performed; a cycle IDSEL_CODE that identifies the standard memory that must communicate with the external system host; seven cycles ADD_CODE that provide the address of the location in which the host must perform a read or write operation; a cycle MSIZE that specifies the number of bytes to be read; and two cycles TAR_CODE with which the external host releases control of the system bus to the memory.

Finally, the memory transfers the read data and releases control of the system bus through a sequence of cycles identical to that of the LPC protocol described with reference to FIG. 2. The memory device of FIG. 1 is capable of decoding both protocols, but once the circuit CAM SETTING is configured during the test on wafer stage of fabrication, it supports only a single protocol.

In fact the FLASH memory cell contained in the circuit CAM SETTING needs to be reprogrammed to let the device support the other protocol, but this cannot be done by the customer but only by the manufacturer. It is very difficult if not impossible to use the memory devices by alternating different communication protocols, unless at each protocol change the circuit CAM SETTING is reconfigured by the manufacturer.

SUMMARY OF THE INVENTION

In view of the foregoing background, an object of the invention is to provide a memory device supporting a plurality of communication protocols, and one that recognizes automatically the protocol used for accessing the memory.

Different from known devices, the memory device of the invention is not configured in a substantially permanent way for a selected protocol during the "test on wafer" stage. It may be used by a customer when alternately using different communication protocols because the device is capable of recognizing the protocol being used and configuring itself for supporting the protocol.

This and other objects, advantages and features in accordance with the invention are provided by a memory device accessible with a plurality of communication protocols having at least a pair of interfaces each capable of decoding a certain communication protocol when enabled by a respective enable signal. The interfaces are coupled to an external bus, to the address bus and to the data bus. Each interface receives a timing signal for generating a chip enable command and a write enable command.

The memory device further comprises an automatic selection circuit coupled to the interface and to the external bus, and is input with the timing signal and with a start signal of a protocol cycle. The automatic selection circuit compares the bits transmitted during a preamble portion of the protocol with predefined bit patterns corresponding to the different preambles of the supported protocols. The automatic selection circuit generates the enable signal for the relative interface corresponding to an edge of the start signal of the transmitted preamble sequence of bits.

BRIEF DESCRIPTION OF THE DRAWINGS

The different aspects and advantages of the invention will appear even more evident through a detailed description referring to the attached drawings, in which:

FIG. 2 shows a sample sequence of LPC protocol cycles for performing a read operation according to the prior art;

FIG. 3 shows a sample sequence of firmware hub protocol cycles for performing a read operation according to the prior art;

DETAILED DESCRIPTION OF THE PREFERRED EMBODIMENTS

Figure 4:
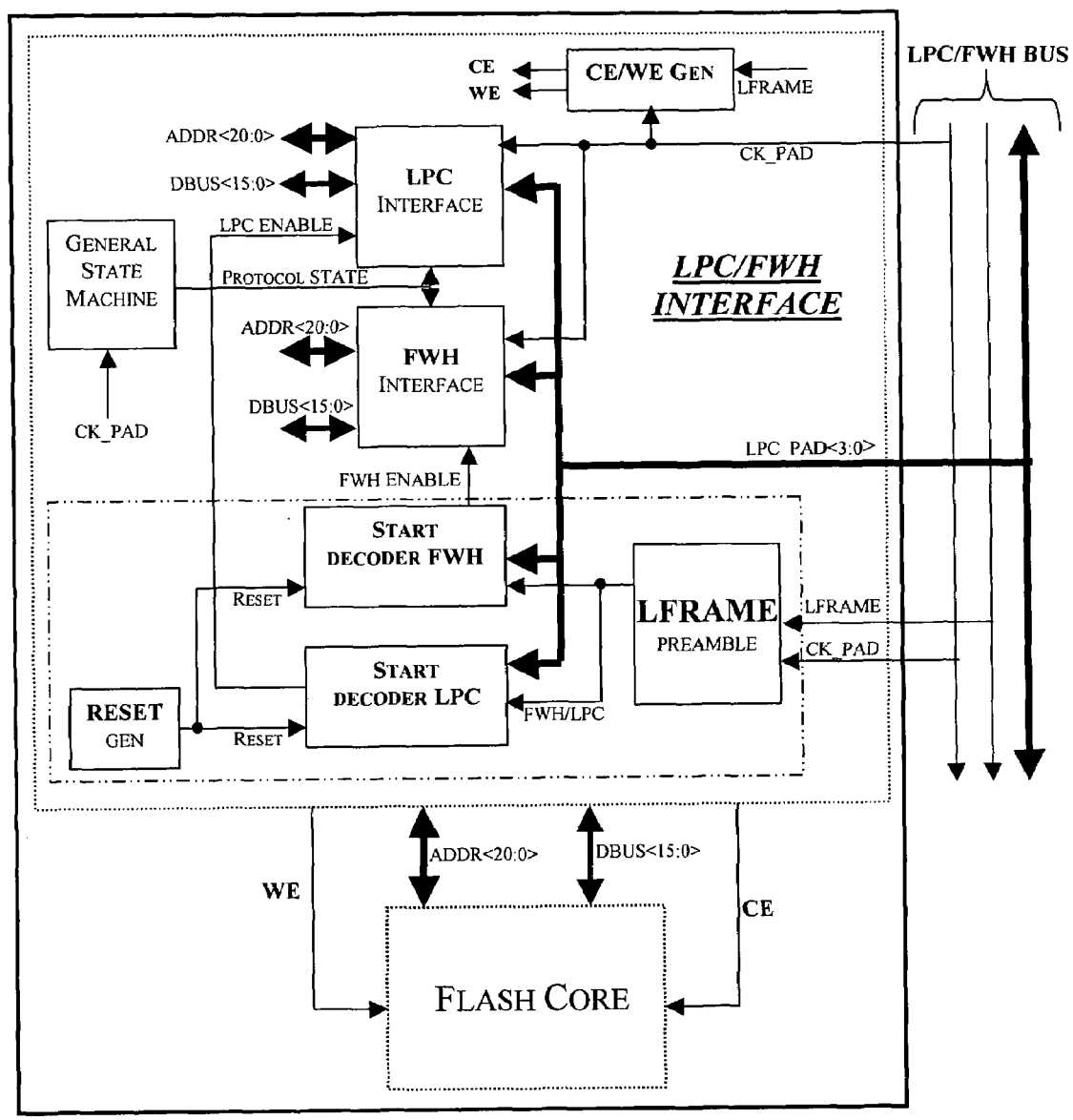
FIG. 4 is a block diagram of a memory device having an automatic selection circuit of the interface to be used according to the present invention.

A sample embodiment of the memory device of the invention designed for supporting two different communication protocols is depicted in FIG. 4. The multi-protocol interface LPC/FWH INTERFACE comprises a generation circuit CE/WE GEN for generating the chip enable command CE (Chip Enable) of the standard memory FLASH CORE, and two distinct interfaces LPC INTERFACE and FWH INTERFACE for respectively managing the LPC and firmware hub protocols. A state machine GENERAL STATE MACHINE configures the interfaces by the signal PROTOCOL STATE. An automatic selection circuit of the interface is identified in the figure by a dot and dash rectangle.

Figure 1:
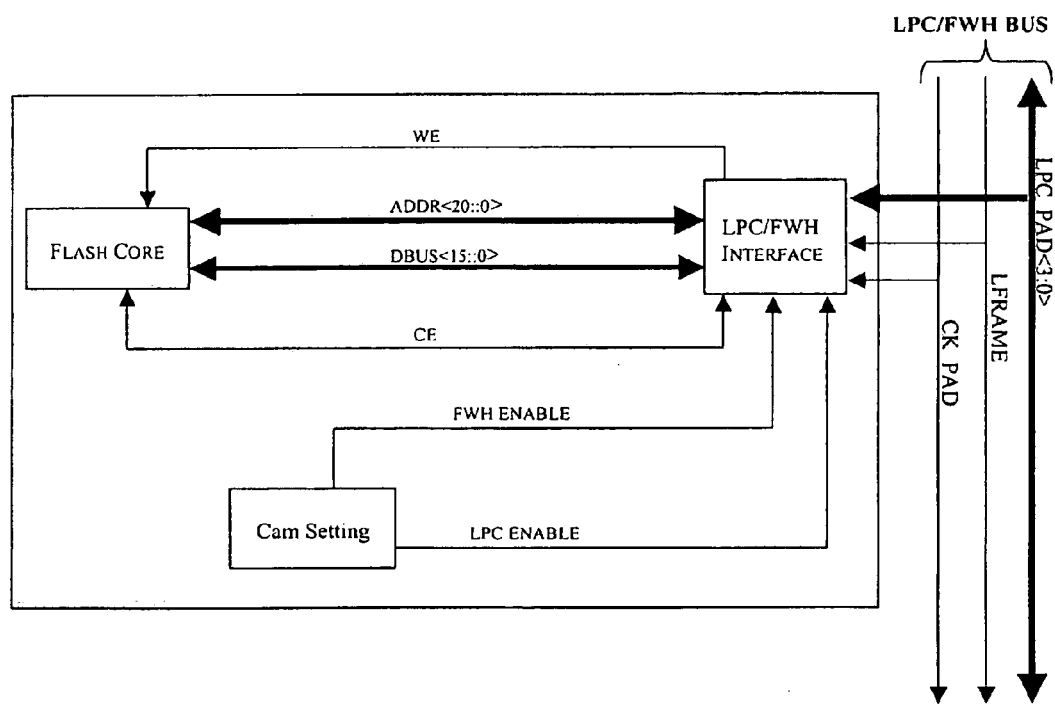
FIG. 1 is a block diagram of a memory device according to the prior art.

A substantial difference between a memory device of the invention and the known device of FIG. 1 is that the selection circuit automatically discriminates whether a received sequence of bits belongs to an LPC protocol preamble or to a firmware hub protocol preamble, thus enabling the proper interface for decoding the ensuing protocol cycle.

When the circuit LFRAME PREAMBLE detects a variation of the start signal LFRAME that indicates that a preamble START_CODE is being transmitted, it generates a local clock signal FWH/LPC as a function of the timing signal CK_PAD and of the start signal LFRAME_PAD. Each circuit block START DECODER FWH and START DECODER LPC compares the received sequence of bits of the preamble with pre-established patterns corresponding to the preamble START_CODE of respective communication protocols. This is performed while using the local clock signal FWH/LPC as a time base.

When one of the two circuits recognizes the received sequence of bits as the preamble of either an LPC or a firmware hub protocol, it generates the respective enable signal FWH ENABLE or LPC ENABLE. The corresponding interface enabled by the enable signal will decode the protocol and perform the required read or write operation in the standard memory core.

FIG. 4 also depicts the circuit RESET GEN that generates a reset signal RESET of the circuit blocks START DECODER FWH and START DECODER LPC when turning on the memory device and when none of the supported protocols has yet been recognized.

Figure 5:
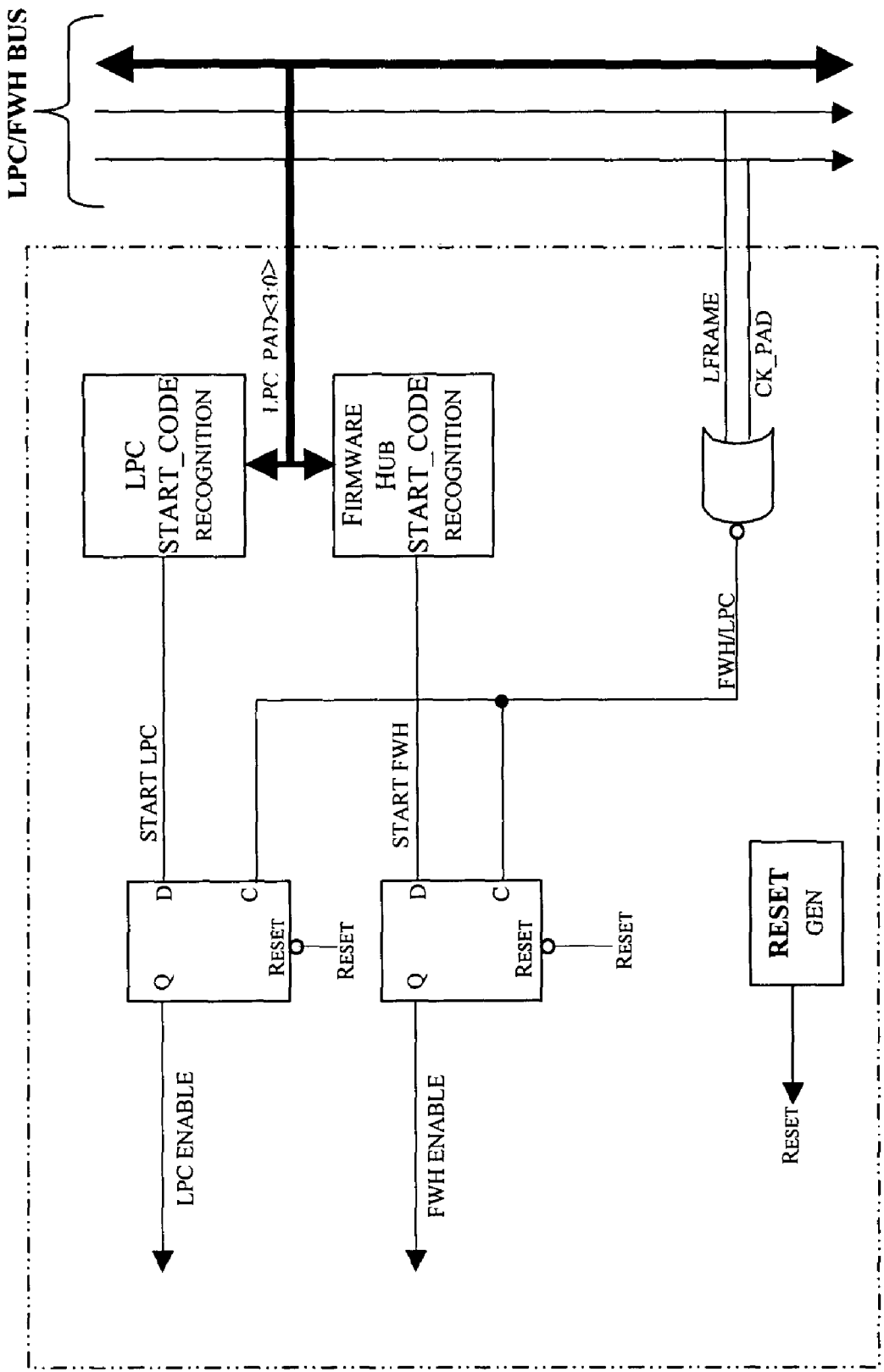
FIG. 5 depicts in greater detail the automatic selection circuit of the memory device of FIG. 4.

A detailed diagram of an embodiment of the automatic selection circuit of the memory device of the invention is depicted in FIG. 5. The circuit LFRAME PREAMBLE is a NOR gate input with the start signal LFRAME and the timing signal CK_PAD. The circuit blocks START DECODER FWH and START DECODER LPC are substantially formed by respective pattern recognition circuits of the sequence of bits of a preamble LPC START_CODE RECOGNITION and FWH START_CODE RECOGNITION. The pattern recognition circuits generate respective flags START_LPC and START_FWH when either an LPC or a firmware hub preamble is recognized, respectively. D-type flip-flops are input with the local clock signal FWH/LPC on the timing input C, and with a respective flag START_LPC or START_FWH on the data input D.

When a sequence of bits is recognized as corresponding to the preamble of a certain protocol cycle, the enable signal for the corresponding interface is generated in coincidence with a transition edge of the local clock signal FWH/LPC.

The invention has been described by referring to a memory device designed to support two protocols. As will be evident to those skilled in the art, it is possible to form memory devices capable of managing more than two protocols by simply increasing the number of interfaces contained in the multi-protocol interface block LPC/FWH INTERFACE, and by adding as many D-type flip-flops and pattern recognition logic circuits, as depicted in FIG. 5.

With devices made according to the invention, the user may access the standard memory core FLASH CORE using any one of the supported protocols, even by alternating them, which is not possible in the prior art devices.

That which is claimed is:

1. A memory device accessible with different communication protocols, the memory device comprising:
a plurality of pins being connected to an external bus;
a memory having inputs for receiving a chip enable command and a write enable command;
an address bus and a data bus coupled to said memory;
a multi-protocol interface coupled to said plurality of pins for receiving a timing signal and a start signal of a received communication protocol cycle, and coupled to said address and data busses and generating the chip enable command and the write enable command for said memory, said multi-protocol interface comprising at least two interfaces, each interface for decoding a respective communication protocol when enabled by a respective interface enable signal; and
an automatic selection circuit for selecting one of said at least two interfaces to be used and receiving as inputs the timing signal and the start signal of the received communication protocol cycle, said automatic selection circuit comparing bits transmitted during a preamble of the received communication protocol cycle with pre-established bit patterns corresponding to preambles of the communication protocols associated with said at least two interfaces, and generating the respective interface enable signal for one of said at least two interfaces based upon the comparison, the comparison corresponding to an edge of the start signal.

2. A memory device according to claim 1, wherein said automatic selection circuit comprises:
   a NOR gate having inputs for receiving the timing signal and the start signal of the received communication protocol cycle, and an output for providing a local clock signal;
   at least two logic circuits coupled to the external bus, each logic circuit comparing sequences of received bits with a respective pattern corresponding to the pre-established bit patterns for generating a flag for the recognized pattern; and
   at least a pair of D-type flip-flops, each flip-flop receiving on a timing input the local clock signal and on a data input a respective flag signaling recognition of a pattern for generating the respective interface enable signal.

3. A memory device according to claim 2, wherein said automatic selection circuit further comprises reset circuit means for generating a reset signal to said at least a pair of D-type flip-flops when turning on the memory device and when said at least two logic circuits does not recognize a preamble of one of the communication protocols associated with said at least two interfaces.

4. A memory device according to claim 1, wherein the memory comprises a FLASH memory.

5. A memory device according to claim 1, wherein the communication protocols associated with said at least two interfaces comprises a low pin count (LPC) protocol and a firmware hub protocol.

6. A memory device comprising:
   a plurality of pins;
   a memory having inputs for receiving a chip enable command and a write enable command;
   an address bus and a data bus coupled to said memory;
   a multi-protocol interface coupled to said plurality of pins and to said address and data busses, and generating the chip enable command and the write enable command for said memory, said multi-protocol interface comprising at least two interfaces, each interface for decoding a respective communication protocol when enabled by a respective enable signal; and
   an automatic selection circuit for selecting one of said at least two interfaces corresponding to a received communication protocol, said automatic selection circuit comparing bits transmitted during a preamble of the received communication protocol with pre-established bit patterns corresponding to preambles of the communication protocols associated with said at least two interfaces, and generating the respective enable signal for one of said at least two interfaces based upon the comparison.

7. A memory device according to claim 6, wherein said multi-protocol interface and said automatic selection circuit are coupled to an external bus via said plurality of pins for receiving the communication protocol.

8. A memory device according to claim 7, wherein said multi-protocol interface receives a timing signal and a start signal of the received communication protocol; and wherein the comparison by said automatic selection circuit corresponds to an edge of the start signal.

9. A memory device according to claim 8, wherein said automatic selection circuit comprises:
   a NOR gate having inputs for receiving the timing signal and the start signal of the received communication protocol, and an output for providing a local clock signal;
   at least two logic circuits coupled to the external bus, each logic circuit comparing sequences of received bits with a respective pattern corresponding to the pre-established bit patterns for generating a flag for the recognized pattern; and
   at least a pair of D-type flip-flops, each flip-flop receiving on a timing input the local clock signal and on a data input a respective flag signaling recognition of a pattern for generating the respective interface enable signal.

10. A memory device according to claim 9, wherein said automatic selection circuit further comprises reset circuit means for generating a reset signal to said at least a pair of D-type flip-flops when turning on the memory device and when said at least two logic circuits does not recognize a preamble of one of the communication protocols associated with said at least two interfaces.

11. A memory device according to claim 6, wherein the memory comprises a FLASH memory.

12. A memory device according to claim 6, wherein the communication protocols associated with said at least two interfaces comprises a low pin count (LPC) protocol and a firmware hub protocol.

13. A method for recognizing different communication protocols in a memory device comprising a plurality of pins, a memory, an address bus and a data bus coupled to the memory, and a multi-protocol interface coupled to the plurality of pins and to the address and data busses, the multi-protocol interface comprising at least two interfaces, each interface for decoding a respective communication protocol when enabled by a respective interface enable signal, the method comprising:
   providing a received communication protocol to the multi-protocol interface;
   comparing bits transmitted during a preamble of the received communication protocol with pre-established bit patterns corresponding to preambles of the communication protocols associated with the at least two interfaces; and
   generating the respective interface enable signal for one of the at least two interfaces based upon the comparison.

14. A method according to claim 13, wherein the multi-protocol interface and the automatic selection circuit are coupled to an external bus via the plurality of pins for receiving the communication protocol.

15. A method according to claim 13, wherein the memory device comprises an automatic selection circuit connected to the multi-protocol interface for performing the comparing and generating.

16. A method according to claim 15, wherein the multi-protocol interface receives a timing signal and a start signal of the received communication protocol; and wherein the comparing corresponds to an edge of the start signal.

17. A method according to claim 16, wherein said automatic selection circuit comprises:
   a NOR gate having inputs for receiving the timing signal and the start signal of the received communication protocol, and an output for providing a local clock signal;
   at least two logic circuits coupled to the external bus, each logic circuit comparing sequences of received bits with a respective pattern corresponding to the pre-established bit patterns for generating a flag for the recognized pattern; and at least a pair of D-type flip-flops, each flip-flop receiving on a timing input the local clock signal and on a data input a respective flag signaling recognition of a pattern for generating the respective interface enable signal.

18. A method according to claim 17, wherein the automatic selection circuit generates a reset signal to the at least a pair of D-type flip-flops when turning on the memory device and when the at least two logic circuits does not recognize a preamble of one of the communication protocols associated with the at least two interfaces.

19. A method according to claim 13, wherein the memory comprises a FLASH memory.

20. A method according to claim 13, wherein the communication protocols associated with the at least two interfaces comprises a low pin count (LPC) protocol and a firmware hub protocol.

* * * * *